United States Patent [19]
Detwiler

[11] 3,817,307
[45] June 18, 1974

[54] ANTI-SKID ASSEMBLY

[75] Inventor: John H. Detwiler, Westbury, N.Y.

[73] Assignee: Detwiler Corporation, Westbury, N.Y.

[22] Filed: June 13, 1972

[21] Appl. No.: 262,280

Related U.S. Application Data

[63] Continuation-in-part of Ser. No. 56,475, July 20, 1970, Pat. No. 3,683,990, which is a continuation-in-part of Ser. No. 847,965, Aug. 6, 1969, abandoned.

[52] U.S. Cl. ............................. 152/226, 152/239
[51] Int. Cl. ............................................ B60c 27/10
[58] Field of Search ............ 152/226, 239, 241, 222

[56] References Cited
UNITED STATES PATENTS

| 1,394,312 | 10/1921 | Leech, Jr. | 152/222 |
|---|---|---|---|
| 1,457,395 | 6/1923 | Reisler | 152/226 |
| 2,341,317 | 2/1944 | Faulds | 152/222 |
| 3,431,961 | 3/1969 | Dfoertner | 152/222 |

FOREIGN PATENTS OR APPLICATIONS

| 780,102 | 7/1957 | Switzerland | 152/222 |
|---|---|---|---|
| 30,827 | 11/1907 | Germany | 152/241 |
| 303,018 | 8/1929 | Great Britain | 152/222 |

Primary Examiner—Robert G. Sheridan
Assistant Examiner—Kenneth Noland
Attorney, Agent, or Firm—Kane, Dalsimer, Kane, Sullivan and Kurucz

[57] ABSTRACT

An anti-skid assembly adapted to be removably mounted on a tire having a pair of opposed side walls and a peripheral road contacting outer circumferential surface. The assembly includes a plurality of deformable straps with each strap having a greater width than thickness and having a length sufficient to permit the central portion of each strap to extend transverse to the circumferential surface of the tire across the entire surface. The end portions of each strap extend beyond in adjacent relationship to at least a portion of the opposed side walls of the tire. Anchor means are provided and are connected to the straps and they are adapted to normally attach the straps to the tire with the straps being in spaced relationship on the outer surface of the tire. The central portion of each strap is adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between the tire and road and when the tire skids on soft surfaces such as snow, mud or sand surface frictional and/or mechanical engagement between each strap and the road will cause the strap to automatically deform and twist so that at least a portion of the dimensional width on the undersurface of the strap is brought into contact with the snow, mud or sand surface thereby increasing mechanical engagement with the road and assisting in stopping the slippage and returning the tire to normal engagement with the road covering. At that time, the strap will automatically return to its normal configuration and position.

19 Claims, 18 Drawing Figures

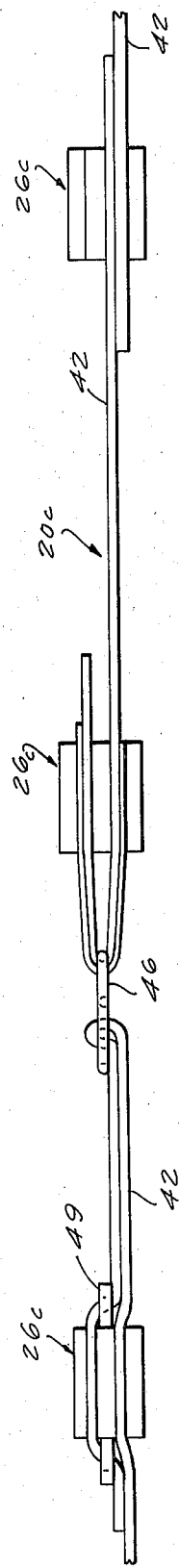
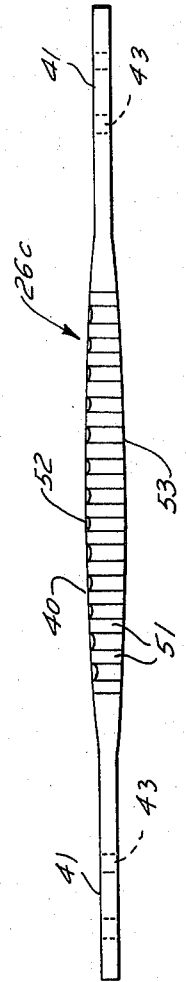
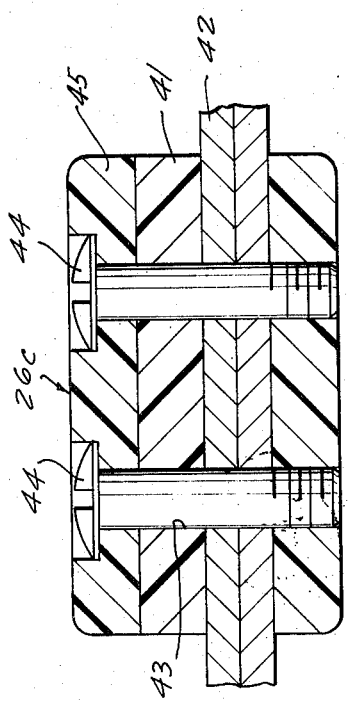
FIG. 16
FIG. 18
FIG. 17

ANTI-SKID ASSEMBLY

CROSS-REFERENCE TO RELATED APPLICATIONS

This application is a continuation-in-part application of my previously filed application, Ser. No. 56,475, filed on July 20, 1970, now U.S. Pat. No. 3,683,990 which in turn was a continuation-in-part application of my previously filed application, Ser. No. 847,965, filed on Aug. 6, 1969, now abandoned.

BACKGROUND OF THE INVENTION

Our above mentioned previous applications represented a significant improvement in alleviating the danger of skidding of the wheels of motor vehicles. The shortcomings of common types of devices used to increase traction such as chains, metallic studs and enlarged thread designs are discussed in detail and are equally applicable in regard to the improved design included herein.

For example, among the disadvantages present in the use of chains is the fact that they are difficult to remove and apply to the tires while the tires are on the motor vehicle. Additionally, when the motor vehicle has extracted itself from its non-traction position and is running in normal engagement with the road surface, the chains cause noise, great discomfort to the operator, and damage to the road surface. Chains also have a tendency to wear and to eventually break.

Snow tire arrangements either in the form of tread design or by the presence of metal studs located in the tire tread do provide a greater amount of comfort during normal travel of the tire on the road surface. However, this type of tire does not provide as great an amount of traction when the motor vehicle is skidding on a slippery surface or on a surface which contains a significant amount of snow. Additionally, the presence of the studs and the presence of the enlarged tread design also result in an increased amount of noise during normal operation of the motor vehicle over the normal and acceptable noise level present with a regular tire.

The various shortcomings of the above increased traction devices, among others, were effectively overcome by the designs previously described in my above referenced prior applications. In summary, a non-skid tire structure of various embodiments was provided in my prior applications whereby traction was substantially equivalent to that provided by chains while the noise level during normal running operations was at least as satisfactory as that provided by normal snow tires and studs. Furthermore, the improved designs included a non-skid tire structure wherein the traction element may be either permanently applied to the tire or removably applied to the tire and which would automatically shift from a non-engaging or a minimum engaging position on the tire surface to a fully engaging position on the tire surface when skidding occurs to thereby assist in stopping the skid and returning the tire to normal engagement with the road surface. When the tire has been returned to normal non-skidding engagement with the road surface, the skid reduction portion of the tire structure will return to its normal original position thereupon alleviating the noise factor of the tire under normal non-skid operating conditions and additionally alleviating the danger of fracture of any portion of the non-skid assembly employed as part of the tire structure.

It has been found that an additional improvement would be advantageous in the art by providing a non-skid assembly adapted for mounting on a normal available type of tire presently on the market. An assembly of this type which would retain the above mentioned advantages of my previous designs as well as additionally being available for common commercial size and type tires would be extremely valuable and would constitute a significant improvement in the art.

SUMMARY OF THE INVENTION

With the above discussed in mind, it is among the primary objectives of this invention to provide an anti-skid assembly which incorporates the above mentioned advantageous features while eliminating the above discussed disadvantages of prior known chain, stud and snow tire arrangements while additionally providing an assembly which is readily adaptable to be used with commercially available tires on the market today. An anti-skid tire structure is provided which automatically moves to a traction enganging position when the tire begins to skid and which automatically returns to its normal retracted position when the tire resumes the normal engagement with the road surface. The tire on which the anti-skid assembly is mountable upon is one which requires no special design and therefore may be any common commercial regular tire structure. The invention includes strap elements which are adapted to form a part of the anti-skid assembly and which are abrasive resistant and deformable so as to readily facilitate the automatic action of the assembly and assist in stopping a skid when positioned on a tire.

In summary, an anti-skid assembly is provided which is adapted to be removably mounted on a tire having a pair of opposed side walls and a peripheral road contacting outer circumferential surface. The assembly comprises a plurality of deformable straps with each strap having a greater width than thickness and having a length sufficient to permit the central portion of each strap to extend transverse to the circumferential surface of the tire across the entire surface. The end portions of the strap extend beyond in adjacent relationship to at least a portion of the opposed side walls of the tire. Anchor means are provided to be connected to the straps and are adapted to reasonably attach the straps to the tire with the straps being in spaced relationship on the outer surface of the tire. The central portion of each strap is adapted to be normally positioned on the circumference of the tire with the dimensional width sides being substantially parallel with the circumferential surface of the tire. Therefore, when the tire is rotating in normal engagement with a road surface each strap will remain in the normal position and offer minimum resistance to driving engegement between tire and road and when the tire skids on soft surfaces such as snow, mud or sand frictional and/or mechanical engagement between each strap and the road will cause the strap to automatically deform so that at least a portion of the dimensional width on the underside of the strap is brought into contact with the snow, mud or sand thereby increasing mechanical engagement with the road and assisting in stopping the slippage and returning the tire to normal engagement with the road covering at which time the strap will automatically return to its normal configuration and position.

BRIEF DESCRIPTION OF THE DRAWINGS

In the drawings:

FIG. 16 is a fragmentary side plan view thereof;

FIG. 17 is a fragmentary enlarged sectional view of the connecting portion between a strap element and an anchor element thereof taken along the plane of line 17—17 of FIG. 15; an FIG. 18 is a side elevation view of a strap element portion thereof.

DESCRIPTION OF THE PREFERRED EMBODIMENT

The anti-skid tire structure 20 of the invention is depicted in one embodiment in FIGS. 1-8 of the drawings.

Figure 1:
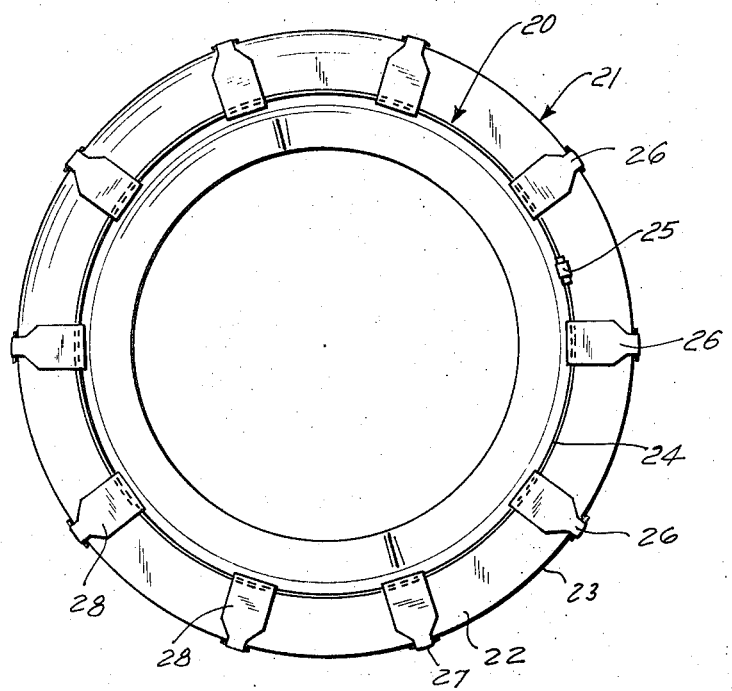
FIG. 1 is a side elevation view of an anti-skid assembly of the invention mounted on a tire.
Figure 2:
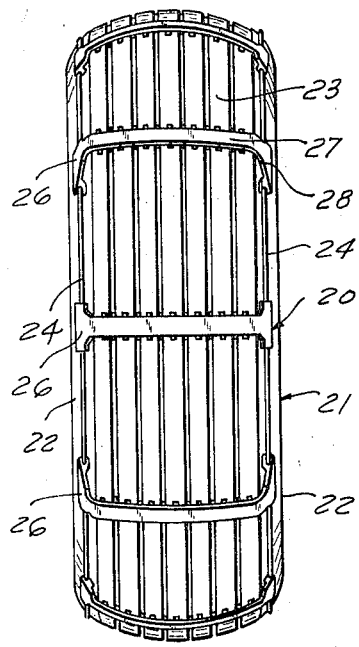
FIG. 2 is a side elevation view thereof.
Figure 3:
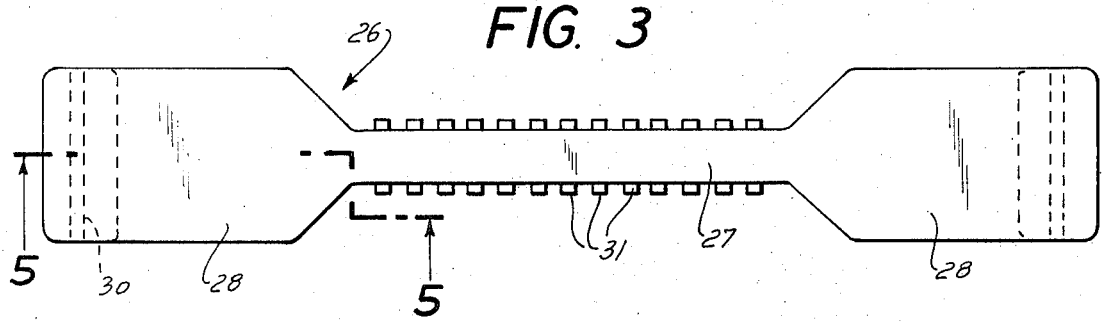
FIG. 3 is a top plan view of a strap element portion of an anti-skid assembly of the invention.
Figure 4:
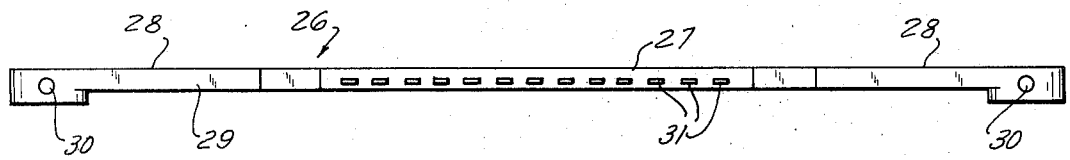
FIG. 4 is a side elevation view thereof.
Figure 5:
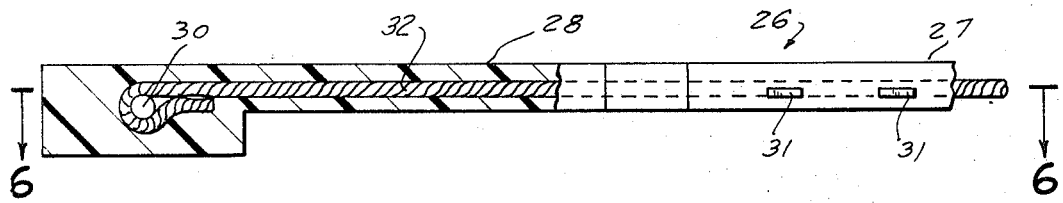
FIG. 5 is an enlarged fragmentary partial sectional view thereof taken along the plane of line 5—5 of FIG. 3.
Figure 6:
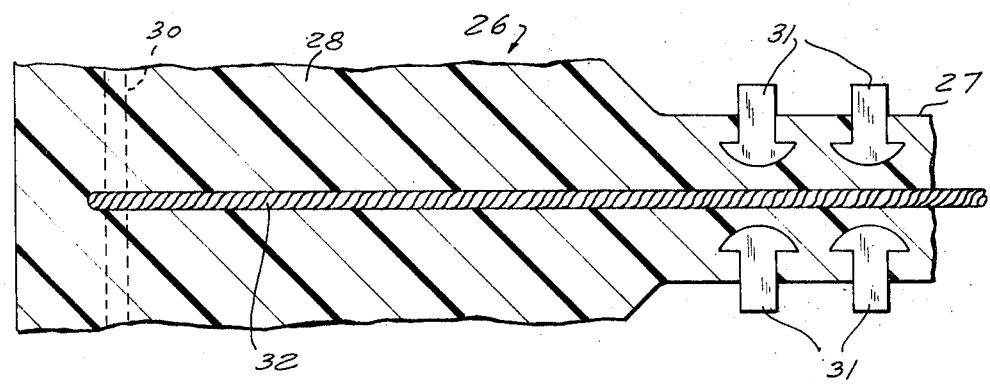
FIG. 6 is an enlarged top sectional view thereof taken along the plane of line 6—6 of FIG. 5.

FIGS. 1 and 2 show assembly 20 mounted to a conventional tire 21. The tire may be any common type of tire utilized on a motor vehicle. Tire 21 has two opposing side walls 22 and an outer peripheral circumferential surface 23.

Anti-skid assembly 20 includes a pair of anchor members 24 one of which is positioned on each side of tire 21 against a respective side wall 22. As shown, anchor members 24 are substantially circular in configuration and form a continuous member. At least one of anchor members 24 includes a common type of fastening means 25 which is utilized to disengage continuous anchor member 24 and facilitate removal of assembly 20 from tire 21. Each anchor member 24 is shown as a length of cable, for example, steel cable. Naturally, the anchor member may be constructed of many other similar materials of substantially the same strength such as a metal chain.

Anti-skid assembly 20 also includes a plurality of transverse strap elements 26. Each strap 26 is formed of a highly abrasion-resistant material such as polyurethane or high molecular weight polyethylene. As shown particularly in FIGS. 3-6, each strap 26 is substantially the same in size and configuration. In regard to the width dimension of strap 26, the central portion 27 is of a rather narrow width and the respective end portions 28 are of substantially greater width. End portions 28 taper gradually at their end so as to connect continuously with the narrower central portion 27. As shown particularly in FIG. 4, the strap 26 has a rather small thickness side dimension 29. The extremities of end portions 28 are somewhat thickened so as to provide a surrounding surface to a continuous passageway 30 through which is passed cable 24 for purposes of connection of strap 26 to cable 24 to form anti-skid assembly 20. As can be seen best in FIGS. 1 and 2, central portion 27 is of substantially the same length as circumferential outer surface 23 of the tire so that when anti-skid assembly 20 is positioned on a tire central portion 27 will be exposed to the road surface during rotation of the tire and end portions 28 can be bent downward into adjacent relationship with the peripheral side walls 22 of tire 21. Strap 26 is of a resilient deformable material such as polyurethane and polyethylene so that the end portions 28 may be bent downward into adjacent relationship to the side walls of the tire. Therefore, when assembly 20 is positioned on the tire, cables 24 are brought into engagement with side walls 22 or fasteners 25 are engaged thereby mounting the assembly in proper position on the tire with the central portion of each strap in engagement with the outer peripheral surface of the tire and the end portions of each strap in adjacent relationship to the side walls of the tire. The anti-skid assembly and tire combination is then ready for operation.

Returning to consideration of FIGS. 3-6, it should also be noted that projecting from the forward and rear edges of central portion 27 are a plurality of teeth 31. These teeth are of a harder-than-ice material and are designed to increase gripping traction with the road during a skid of the tire with respect to the road surface. As shown, the teeth are mounted within the strap member with projecting portions extending therefrom. They may naturally be attached in any other convenient manner.

It should also be noted that at least one reinforcing member 32 is mounted internally of each strap 26 to add to the wear resistance of the strap element. Reinforcing member 32 may be formed of nylon, fiberglass, polyester, dacron, polypropylene, cotton, or any similar material which acts to reduce the deformation of the strap under stress and is present to prevent the strap material withstanding the abrasion from the road surface from fatiguing, cracking or tearing prematurely. The construction of strap 26 is such that it must be deformable to a certain degree and yet must retain some resistance to deformation which is assisted by the presence of one or more reinforcing members 32. Additionally, each strap 26 must be highly resistant to abrasion and additionally must contain surfaces which will readily engage with the road surface to assist in stopping a skid.

Figure 7:
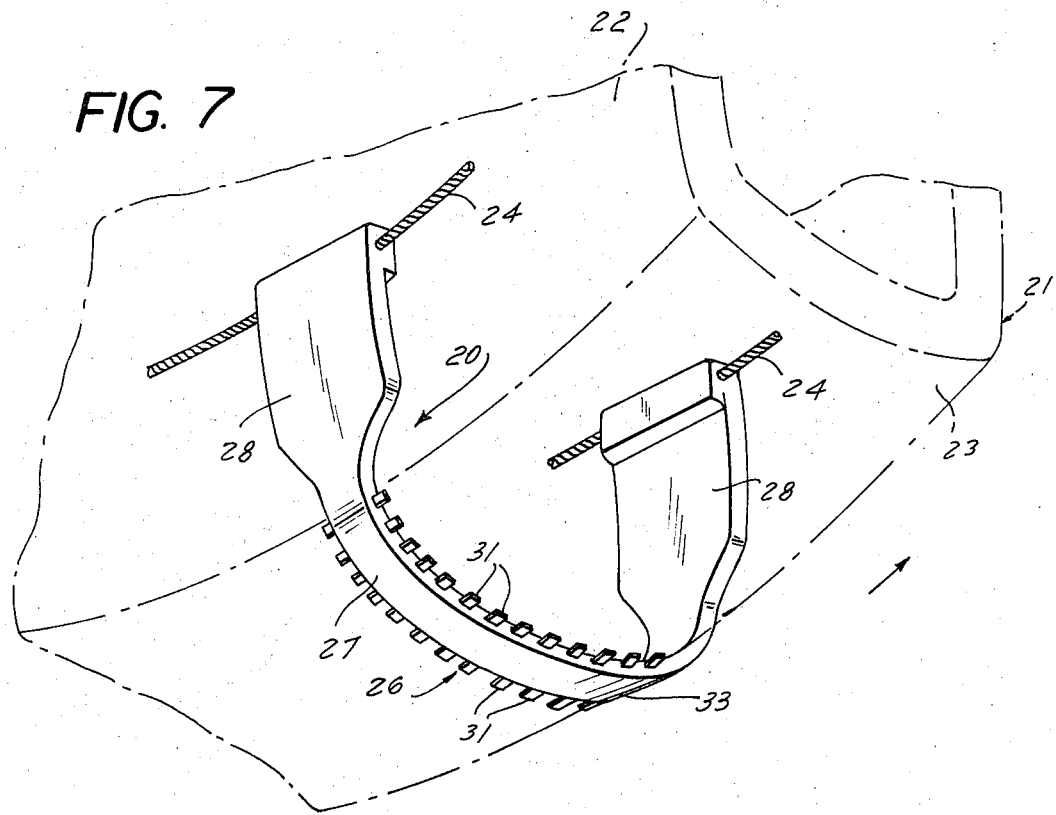
FIG. 7 is a fragmentary perspective view of an anti-skid assembly of the invention shown mounted in normal position on the tire with an arrow showing the direction of rotation thereof.
Figure 8:
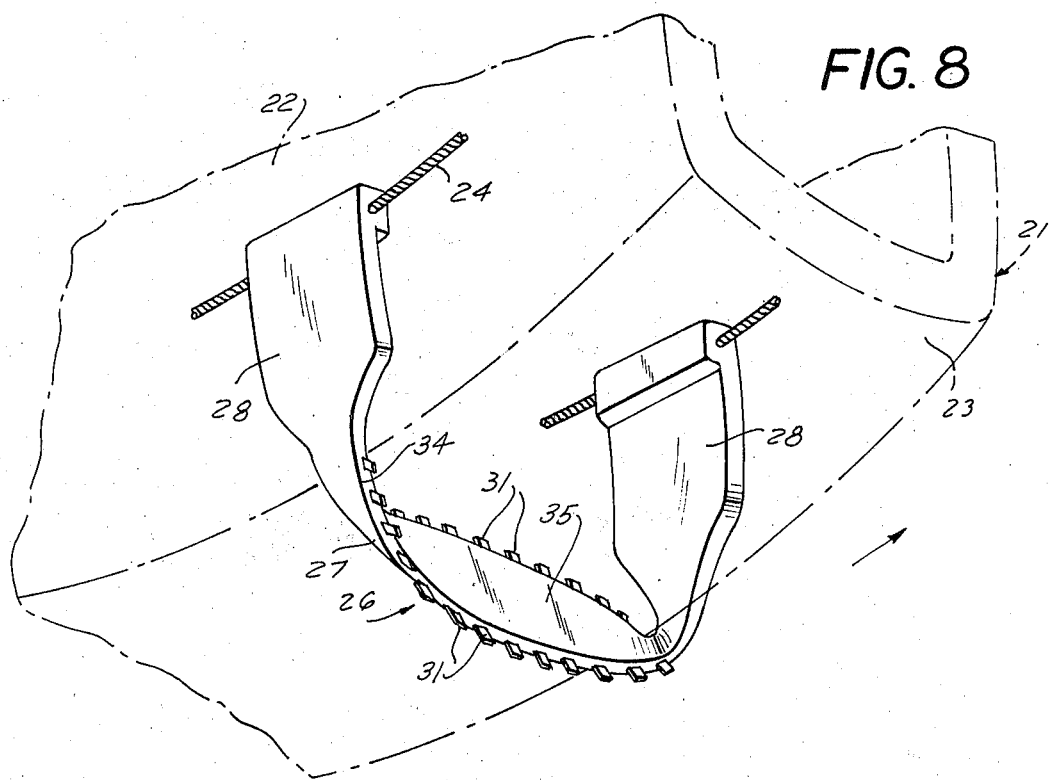
FIG. 8 is a fragmentary perspective view thereof with the strap element shown in the anti-skid position and an arrow showing the direction of rotation of the tire.

FIGS. 7 and 8 show the relative positions of the strap portion of the anti-skid assembly as the tire rotates with respect to the road. The arrow in each figure shows the direction of rotation of tire 21. FIG. 7 represents the normal position of strap member 26 as it passes into contact with the road surface during normal rotation of the tire with respect to the road. In contrast, FIG. 8 represents the position of the strap element 26 of assembly 20 when it comes in contact with the road during a skid of the tire with respect to the road surface.

It should be noted that in normal position, only the top outer surface of central portion 27 comes in contact with the road during rotation of the tire for the most part. This surface consists entirely of the basic deformable material of strap 26 and does not materially detract from normal tire contact with the road. Central portion 27 is relatively thin and therefore does not materially add to the outer dimension of the circumferential surface of the tire at that point. Therefore, noise of the assembly and tire combination is kept at a minimum.

When a skid is initiated as indicated in FIG. 8, frictional engagement between the forward edge 34 of central portion 27 and the road will have greater than normal significance and the central portion of the strap will be deformed so as to expose teeth 31 to the road surface. This increased frictional engagement provided by the rigid teeth 31 with the road surface in additional to exposure of a portion of the undersurface 35 of central portion 27 in a somewhat perpendicular relationship to the road surface will provide a great increase in frictional contact between the tire and assembly combination so that the tendency will be for normal engagement between the tire and road to re-occur. At that time, normal engagement between tire and road will re-occur and central portion 27 of strap 26 will return to its normal configuration shown in FIG. 7. It should be kept in mind that the only strap which acts with respect to the road is a strap which comes in contact with the road at any given point in time. As soon as the portion of the tire where any individual strap is located passes the contact point with the road in its circumferential rotation, the elastic properties of strap 26 will cause it to return to its normal position and configuration. Therefore, at any given point in time, only one strap is acting with respect to the road either in communication in its normal position or in communication with the road in its anti-skid position. The activity of each strap with respect to the road depending upon skid or non-skid conditions is entirely automatic. There is no manual activity involved. The strap moves between the normal and anti-skid positions automatically depending upon conditions between the tire and the road as described in detail above.

In order to facilitate deformation of central portion 27 from the normal position to the anti-skid position, central portion 27 is considerably narrower than end portions 28 as discussed above. Therefore, any deformation or twist in strap 26 caused by skidding will be confined to the central portion 26 which passes across the face of the tire. The wider heavier and more rigid end portions 28 will then act as guiding forces to more quickly and effectively return central portion 27 to its normal configuration where it is untwisted when the vehicle resumes normal operation after a skid.

Figure 9:
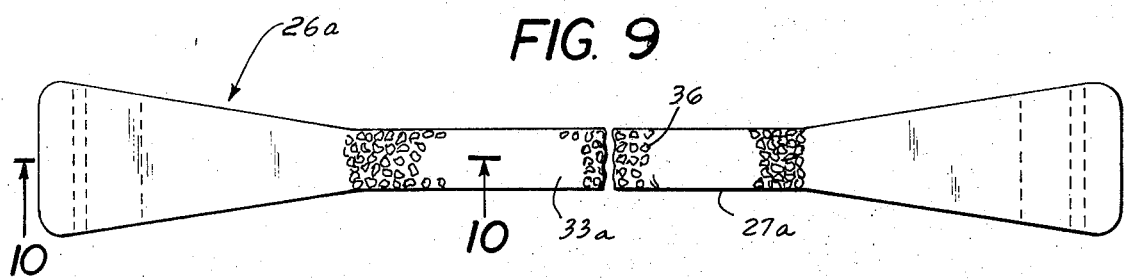
FIG. 9 is a top plan view of an alternate embodiment of a strap element portion of the anti-skid assembly of the invention.
Figure 10:
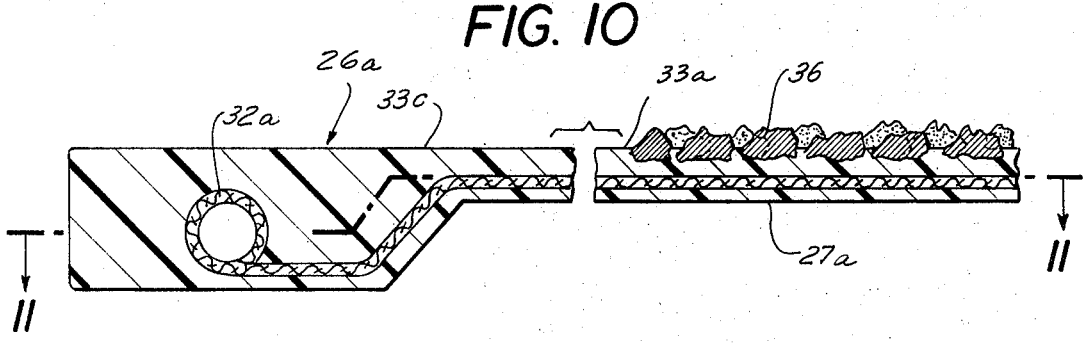
FIG. 10 is an enlarged fragmentary sectional side view thereof taken along the plane of line 10—10 of FIG. 9.
Figure 11:
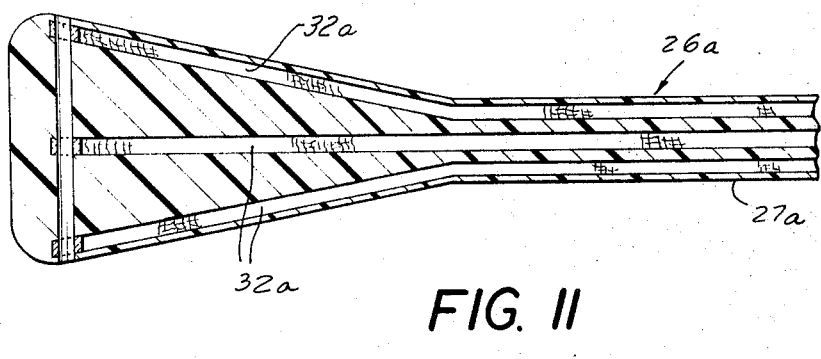
FIG. 11 is an enlarged fragmentary sectional top view thereof taken along the plane of line 11—11 of FIG. 10.

A first alternative embodiment is disclosed in FIGS. 9–11 of the drawings. Strap 26a is of a similar configuration to strap 26 of the previously discussed embodiment and is connected to the anti-skid assembly and the tire in a similar manner. Additionally, operation of the anti-skid assembly with strap 28 positioned thereon is the same as the operation of the initially discussed embodiment. Strap 26a is constructed of the same or similar material as that of strap 26 and includes reinforcing members 32a which are also of the same or similar material as the reinforcing member 32.

Figure 12:
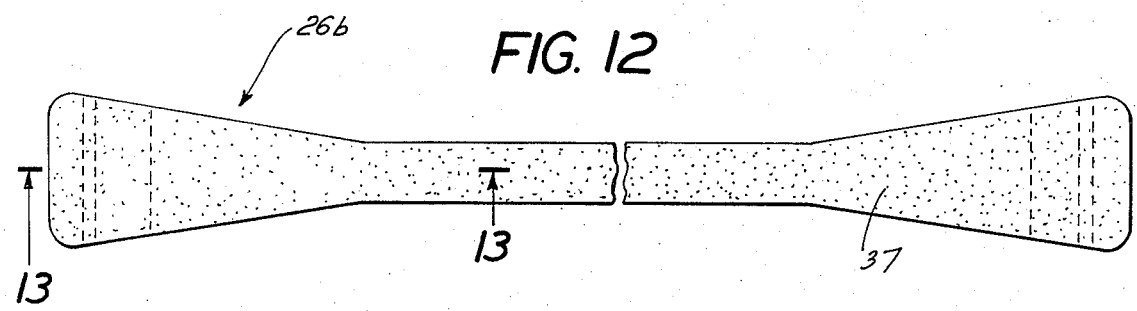
FIG. 12 is a top plan view of a further alternative embodiment of a strap element portion of the anti-skid assembly of the invention.
Figure 13:
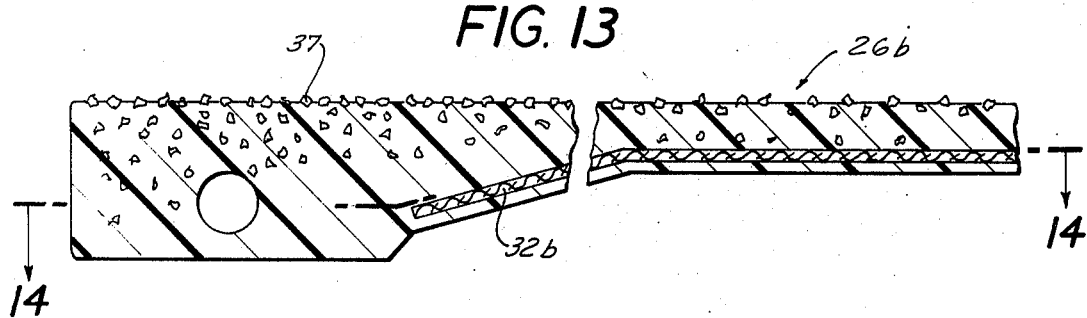
FIG. 13 is an enlarged fragmentary side sectional view thereof taken along the plane of line 13—13 of FIG. 12.
Figure 14:
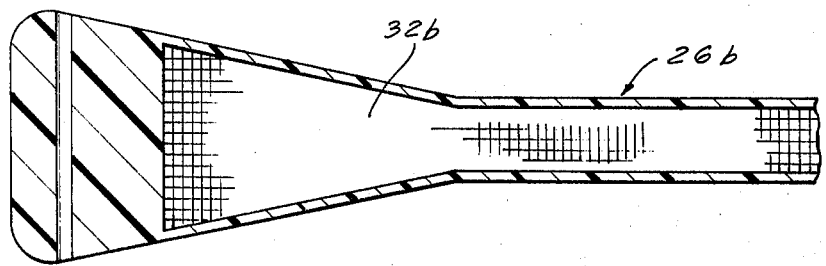
FIG. 14 is an enlarged fragmentary sectional top view thereof taken along the plane of line 14—14 of FIG. 13.

The primary difference in construction of strap 26a lies in the upper surface 33a of central portion 27a. Attached to surface 33a in a convenient manner is a grid or pulverized material 36. This material may be of tungsten carbide, silicon carbide, aluminum oxide, aluminum silicate, boron carbide, diamond dust, or any other material that is harder than ice. Since grid 36 is attached to the road contacting upper surface 33a of strap 26a, the traction is improved on ice and the durability of the strap is increased. A still further embodiment of the invention is disclosed in FIGS. 12–14. In this instance, strap 26b is of substantially the same configuration as straps 26a and 26 and is attached to the anti-skid assembly and tire in a similar manner as the previous embodiments. Additionally, operation of the anti-skid assembly containing strap 26b is substantially the same as that of the previous embodiments. Strap 26b is constructed primarily of the same material as the straps of the previous embodiments and additionally contains at least one reinforcing member 32b for similar reasons as for the reinforcing members of the previously discussed embodiments.

The primary difference present in strap 26b is the presence of a grit or pulverized material 37 interspersed through all or a portion of the abrasion resistant material of strap 26b in order to further increase the abrasion resistance of strap 26b and in order to enable the abrasion resistant material to hold a self-sharpening edge that will improve the traction of the road contacting member on ice.

A further alternative form of the non-skid device is present in FIGS. 15–18. The non-skid assembly 20c depicted there includes a plurality of transverse straps 26c each strap 26c is constructed of a flexible, high strength material, for example, such as polyurethane plastic or a high strength rubber. The central portion 40 of each strap is narrower in diameter than the end flaps 41. Fastened to each end flap 41 and extending laterally in both directions therefrom in an anchor member 42. A flexible material of strength such as a cloth, metal or rubber may be used as the material for anchor strap 42. For adjustment purposes each flat 41 contains a plurality of holes 43 through which threaded bolts 44 are extendable through openings in a clamp 45. Alternatively, rivets may be employed or other common fasteners. As shown, there are two treaded bolts 44 in alignment which may be shifted outwardly or inwardly as desired with respect to the center anchor member 42 into alignment with a pair of aligned openings 43. In this manner, the anchor members may be adjusted in their position on strap 26c to facilitate accommodation of different sized tires 23. Clamp 45 has a central opening into which is extended anchor member 42 and the clamp and strap is then aligned with a pair of openings 43 and bolts 44 extended therethrough and treaded into receiving openings in the bottom of clamp 45 as shown in detail in FIG. 17.

Anchor members 45 are then connected at their ends as shown by a convenient means such as hooks 46. This arrangement is accomplished around the circumference of the tire for a complete assembly to be mounted on the tire to form assembly 20c. The straps are parallel and spaced across the outer periphery of the tire 23 as shown in FIG. 15.

In the connecting operation, the end of anchor member 42 in the form of a loop is passed over open hook portion 47 of hook 46. The loop is formed by folding the end of anchor member 42 back upon itself to be inserted into clamp 45. Bolts 44 are then passed through the double thickness of anchor member 42 through appropriate aligned holes to complete the loop forming operation.

Figure 15:
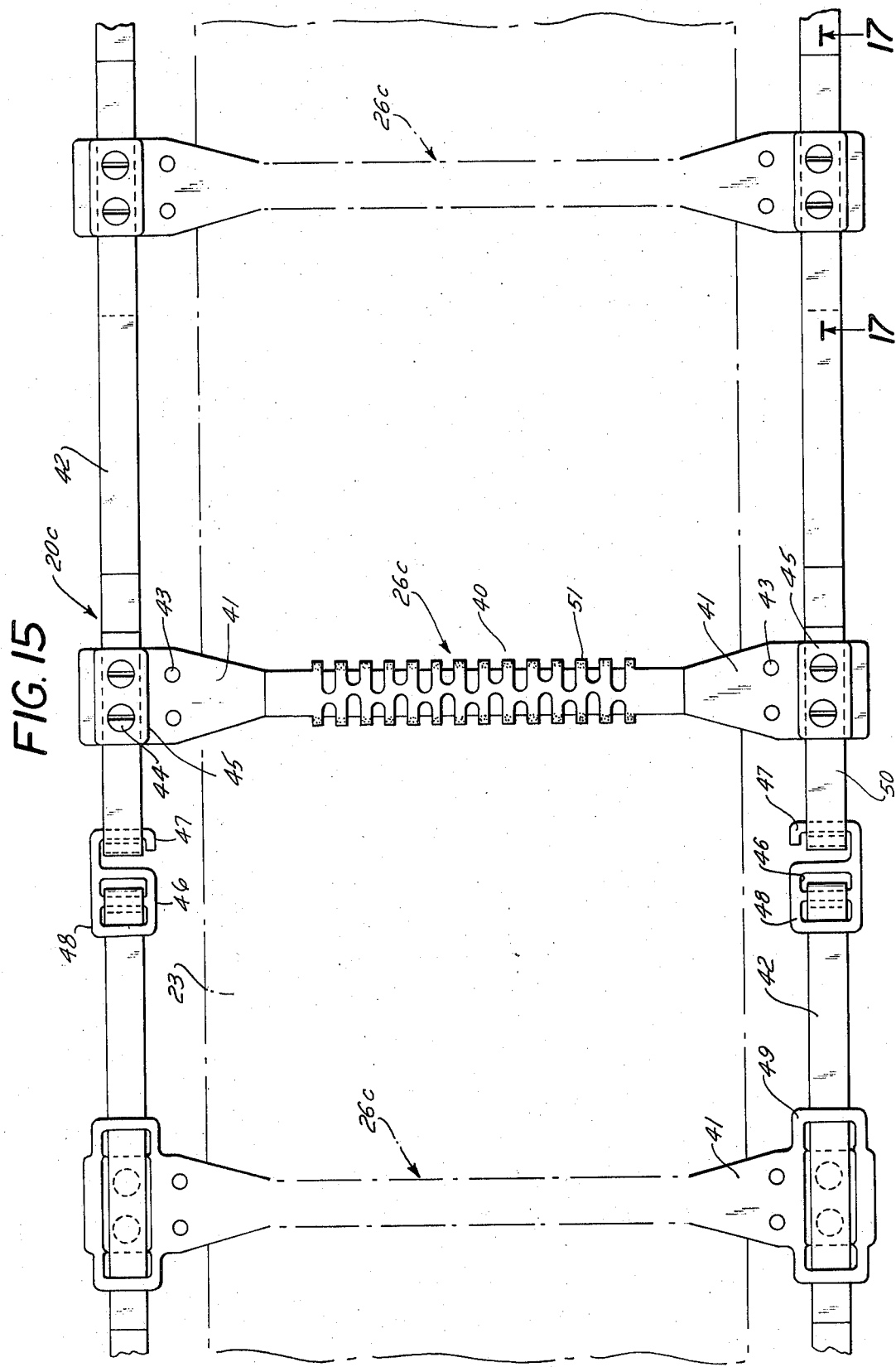
FIG. 15 is a fragmentary top plan view of a further alternate embodiment of an anti-skid tire structure of the invention.

As shown in FIG. 15, the other side 48 of connecting hook 46 contains a bar over which the other end of each anchor strap 42 may be looped and returned through loops 49 in flaps 41 of the adjacent strap 26c. The number of straps 26c in succession which contain receiving loops 49 is a matter of choice depending upon how much reverse treading of strap 42 is desired to complete connection to locking hook 46. In turn, hook 47 which is connected to loop 50 of the other end of the assembly to complete circumferential interengagement of the assembly when mounted on a tire 23 is generally only necessarily double thickness in regard to the adjacent strap 26c to locking hook 46c. It can be readily seen how engagement and disengagement of loop 50 with open receiving hook 47 makes assembly and disassembly of anti-skid assembly 20c relatively easy.

Turning to specific consideration of the narrowed central portion of each cross strap 26c, the outer surface of the cross strap which is normally in contact with the road surface contains a number of lateral protrusions 51. These lateral protrusions 51 form a relatively smooth upper surface 52 for the central portion 40 of each strap 26c when the strap is in normal position with respect to tire 23. However, when the tire begins to skid the protrusions provide teeth for gripping of the road surface and shifting of the strap into the operative position as in the previous embodiments. The undersurface 53 of each strap 26c has grit embedded thereon to form a roughened surface. The grit may be of a similar type as discussed in respect to previous embodiments such as steel carbide particles. The grit serves a dual purpose, it maintains the strap in fixed position with respect to the tire by gripping the tire during normal operation of the tire and when a skid is initiated and the strap is deformed into the operative position, the grit will assist the strap in gripping the slippery road surface in stopping the skid. Thereafter, as in previous embodiments when the skid has been stopped or a particular strap 26c has passed the road engaging point on the circumference of the tire it will relax and return to its normal configuration as shown in FIG. 15.

Under some extreme operating conditions, if the assembly is mounted loosely on the tire the tire could possibly spin inside the assembly, thereby causing damage to the assembly, to the tire, or to both. The spinning can be prevented to roughening the surface of the straps which lie against the tire, by building into the straps a plurality of protrusions which increase the coefficient of friction between the straps and the tire, or by adhering a surface of the straps which increase the coefficient of friction between the straps and the tire. For example, as described above, the straps may be constructed with harder-than-ice particles on at least the side which is against the tire to serve the dual purpose of increasing the coefficient of friction between the strap and the tire and to improve traction on ice when the strap catches on soft spots and irregularities and twists 180 percent so as to expose a portion of the grit surface to the road.

When reinforcing material is utilized in any of the embodiments of the straps described above, the reinforcing material may be positioned closer to the side of the strap which is normally against the tire than to the side of the strap which is normally against the road. This provides maximum protection for the reinforcing material. As stated above, the anchor member may be constructed of a flexible, woven material or of plastic or metal chain.

It should be kept in mind that where a reinforcing member is used for the strap it may be shaped so as to generally conform to the configuration of the strap so that maximum reinforcement can be obtained. The strap reinforcing member may be spun, treaded, brushed or otherwise prepared so as to increase the adhesion between the strap reinforcing member and other materials used in the strap. The reinforcing member may have a higher density of fibers running perpendicular to its length at the ends than at the middle so as to increase its tear strength at the ends thereby facilitating attachment to the side anchor members.

On certain designs, at least one of the anchor members may be made longer than the others in order to facilitate mounting the assembly onto the tire with a return loop so similar means as described above may be used to hold the extra length of the at least one anchor member after the assembly has been mounted on the tire.

On certain occasions, an attachment with a low coefficient of friction can be fastened at or near the end of each strap on the side which is intended to be against the tire for the purpose of reducing scuffing or other damage to the tire.

The attachment between the straps and the anchor members may be accomplished by rivets in lieu of other devices discussed above with a clamp employed to hold the anchor member therein and to which the rivets are fastened. The clamp may be of a material which reduces the coefficient of friction against the side wall of the tire thereby alleviating damage to the side walls of the tire. To this end, the ends of the rivets can be deformed so as to hold the ends of the straps away from the tire sufficiently to reduce the damage to the side walls of the tire.

If desired, a molded plastic hold down may be provided for use with the assembly consisting of a flexible portion which serves as a hinge and a mating configuration to hold it closed when the assembly is mounted on a tire. In addition to the materials described above, the straps may be constructed at least in part of polyurethane plastic. Furthermore, at least a portion of the straps may be textured so as to improve their appearance.

It is readily apparent that the above discussed embodiments clearly define structures which meet the objectives and advantages of the invention as initially described. It should also be readily apparent that the number of embodiments depicted above are merely representative of the variety of different anti-skid assemblies which may be employed while still embodying this invention.

Thus the above objectives of the invention, among others, are effectively attained.

I claim:

1. An anti-skid assembly adapted to be removably mounted on a tire having a pair of opposed side walls and a peripheral road contacting outer circumferential surface comprising:
   a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;
   anchor means connected to the straps and adapted to removably attach the assembly to the tire with the straps being in spaced relationship on the outer surface of the tire;
   the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position; and
   at least the road contacting portion of the strap in the normal position being thin and narrow and in general conformation with the road contacting surface of the tire to thereby provide minimum protrusion from the road contacting surface of the tire and facilitating a relatively smooth tire and road interengagement under normal conditions and the ends of the strap being wider than the central portion thereof to facilitate return of the strap to the normal position and the strap having an intermediate flexible portion between each end and the middle thereof to aid in shifting of positions of the strap.

2. The invention in accordance with claim 1 wherein reinforcing material is positioned within each of the straps so as to reduce deformation of the strap under stress and to minimize the tendency of the strap to fatigue, crack and tear from stresses occurring in the course of its normal use.

3. The invention in accordance with claim 1 wherein each of said straps includes pulverized harder-than-ice material attached to the road contacting surface thereof in order to improve traction on ice and to increase the durability of each strap.

4. The invention in accordance with claim 1 wherein each strap has interspersed through at least a portion thereof a pulverized material in order to increase the abrasion resistance of the strap and to facilitate the holding of a self-sharpening edge on the strap to improve the traction of the road contacting strap on ice.

5. The invention in accordance with claim 1 wherein each strap has a plurality of teeth protruding from at least one of the forward and backward dimensional thickness sides thereof, the teeth substantially out of contact with the road when the strap is in the normal position and being brought into contact with the road when a skid occurs so as to provide improved traction.

6. The invention in accordance with claim 1 wherein each anchor means includes a pair of cable members adapted to be positioned on each of said side walls of a tire respectively and each of said anchor members being attached to one side of each of said straps and normally having a substantially circular configuration and a fastening means is provided on at least one of said cable members facilitating mounting and dismounting of said assembly with respect to a tire.

7. The invention in accordance with claim 1 wherein said anti-skid assembly is mounted on a tire.

8. An anti-skid assembly element adapted to be connected to a tire structure having a pair of opposed side walls and a peripheral road contacting outer circumferential surface and anchor means thereon to receive said element comprising:
   a strap having a substantially greater width than thickness and having a length sufficient to permit the central portion of the strap to extend transverse to the circumferential surface of the tire across the entire surface and the end part portions of the straps to extend beyond in adjacent relationship to at least a portion of the opposed side walls of the tire;
   each strap being adapted to be connected to anchor means which in turn is adapted to removably attach the straps to the tire with the straps being in spaced relationship on the outer surface of the tire;
   the central portion of each strap adapted to be normally positioned on the circumference of the tire with the dimensional width sides being substantially parallel with the circumference surface of the tire so that when the tire is rotating in normal engagement with the road surface each strap will remain in the normal position and offer minimum resistance to driving engagement between tire and road and when the tire skids on a road surface frictional engagement between each strap and the road will cause the strap to automatically deform so that at least a portion of the dimensional width on the undersurface of the strap is brought into contact with the road surface thereby increasing frictional engagement with the road and assisting in stopping the skid and returning the tire to normal engagement with the road at which time the strap will automatically return to its normal configuration and position; and
   at least the road contacting portion of the strap in the normal position being thin and narrow and in general conformation with the road contacting surface of the tire to thereby provide minimum protrusion from the road contacting surface of the tire and facilitating a relatively smooth tire and road interengagement under normal conditions and the ends of the straps being wider than the central portion thereof to facilitate return of the strap to the normal position and the strap having an intermediate flexible portion between each end and the middle thereof to aid in shifting of positions of the strap.

9. The invention in accordance with claim 8 wherein reinforcing material is positioned within each of the straps so as to reduce deformation of the strap under stress and to minimize the tendency of the strap to fatigue, crack and tear from abrasion occurring through contact with the road surface.

10. The invention in accordance with claim 8 wherein each of said straps includes pulverized harder-than-ice material attached to the road contacting surface thereof in order to improve traction on ice and to increase the durability of each strap.

11. The invention in accordance with claim 8 wherein each strap has interspersed through at least a portion thereof a pulverized material in order to increase the abrasion resistance of the strap and to facilitate the holding of a self-sharpening edge on the strap to improve the traction of the road contacting strap on ice.

12. The invention in accordance with claim 8 wherein each strap has a plurality of teeth protruding from at least one of the forward and backward dimensional thickness sides thereof, the teeth substantially out of contact with the road when the strap is in the normal position and being brought into contact with the road when a skid occurs so as to provide improved traction.

13. An anti-skid assembly adapted to be removably mounted on a tire having a pair of opposed side walls and a peripheral road contacting outer circumferential surface comprising:
   a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;
   anchor means connected to the straps and adapted to removably attach the assembly to the tire with the straps being in spaced relationship on the outer surface of the tire;
   the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position; and
   each of said straps including harder-than-ice material attached to the surface thereof which is against the tire so as to improve traction on ice when the strap catches in an irregularity of soft spot and rotates 180° so as to bring the pulverized harder-than-ice material in contact with the ice.

14. An anti-skid assembly element adapted to be connected to a tire structure having a pair of opposed side walls and a peripheral road contacting outer circumferential and anchor means thereon to receive said element comprising:
   a strap having a substantially greater width than thickness and having a length sufficient to permit the central portion of the strap to extend transverse to the circumferential surface of the tire across the entire surface and the end part portions of the straps to extend beyond in adjacent relationship to at least a portion of the opposed side walls of the tire;
   each strap being adapted to be connected to anchor means which in turn is adapted to removably attach the straps to the tire with the straps being in spaced relationship on the outer surface of the tire;
   the central portion of each trap adapted to be normally positioned on the circumference of the tire with the dimensional width sides being substantially parallel with the circumference surface of the tire so that when the tire is rotating in normal engagement with the road surface each strap will remain in the normal position and offer minimum resistance to driving engagement between tire and road and when the tire skids on a road surface frictional engagement between each strap and the road will cause the strap to automatically deform so that at least a portion of the dimensional width on the undersurface of the strap is brought into contact with the road surface thereby increasing frictional engagement with the road and assisting in stopping the skid and returning the tire to normal engagement with the road at which time the strap will automatically return to its normal configuration and position; and
   the strap including harder-than-ice material attached to the surface thereof which is against the tire so as to improve traction on ice when the strap catches in an irregularity or soft spot and rotates 180° so as to bring the pulverized harder-than-ice material in contact with the ice.

15. An anti-skid assembly adapted to be removably mounted on a tire having a pair of opposed side walls and a peripheral road contacting outer circumferential surface comprising:
   a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;
   anchor means connected to the straps and adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position; and each of said straps including protrusions of a harder-than-tread rubber material extending from the side which normally faces the tire in order to increase the frictional engagement between said straps and the tire so as to prevent the tire from spinning inside said straps.

16. An anti-skid assembly element adapted to be connected to a tire structure having a pair of opposed side walls and a peripheral road contacting outer circumferential surface and anchor means thereon to receive said element comprising:

a strap having a substantially greater width than thickness and having a length sufficient to permit the central portion of the strap to extend transverse to the circumferential surface of the tire across the entire surface and the end part portions of the straps to extend bond in adjacent relationship to at least a portion of the opposed side walls of the tire;

each strap being adapted to be connected to anchor means which in turn is adapted to removably attach the straps to the tire with the straps being in spaced relationship on the outer surface of the tire;

the central portion of each strap adapted to be normally positioned on the circumference of the tire with the dimensional width sides being substantially parallel with the circumference surface of the tire so that when the tire is rotating in normal engagement with the road surface each strap will remain in the normal position and offer minimum resistance to driving engagement between tire and road and when the tire skids on a road surface frictional engagement between each strap and the road will cause the strap to automatically deform so that at least a portion of the dimensional width on the undersurface of the strap is brought into contact with the road surface thereby increasing frictional engagement with the road and assisting in stopping the skid and returning the tire to normal engagement with the road at which time the strap will automatically return to its normal configuration and position; and the strap including protrusions of a harder-than-tread rubber material extending from the side which normally faces the tire in order to increase the frictional engagement between the strap and the tire so as to prevent the tire from spinning inside the strap.

17. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps and adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position;

at least one of said anchor members being longer than required to anchor the straps and attach the straps to the tire in order to facilitate mounting the anti-skid assembly onto the tire, and a means to hold the extra length of the at least one anchor member after the assembly has been mounted on the tire; and the extra length of the anchor member being adapted to pass through a loop and double back upon itself while the assembly is being mounted upon the tire so as to give a two-to-one mechanical advantage during the tightening operation.

18. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps and adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position;

at least one of said anchor members being longer than required to anchor the straps and attach the straps to the tire in order to facilitate mounting the anti-skid assembly onto the tire, and a means to hold the extra length of the at least one anchor member after the assembly has been mounted on the tire; and the end of the at least one strap having loops or holes for use in securing the extra length of the at least one anchor member.

19. An anti-skid assembly adapted to be removably mounted on a tire having a pair of opposed side walls and a peripheral road contacting outer circumferential surface comprising:

a plurality of deformable straps with each strap having a greatr width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps and adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position;

the ends of the straps being secured to the anchor members by means of rivets which are attached to the ends of straps and which pass through the anchor members; and the rivets also pass through an additional member which reduces the coefficient of friction against the sidewall of the tire and thereby reduces damage to the sidewalls of the tire.

* * * * *